United States Patent
Graves et al.

(10) Patent No.: US 9,780,424 B2
(45) Date of Patent: Oct. 3, 2017

(54) RECHARGEABLE CARBON-OXYGEN BATTERY

(71) Applicant: Danmarks Tekniske Universitet, Kgs. Lyngby (DK)

(72) Inventors: Christopher Ronald Graves, Copenhagen K (DK); Mogens Bjerg Mogensen, Lynge (DK)

(73) Assignee: Danmarks Tekniske Universitet, Kgs. Lyngby (DK)

( * ) Notice: Subject to any disclaimer, the term of this patent is extended or adjusted under 35 U.S.C. 154(b) by 130 days.

(21) Appl. No.: 14/428,614

(22) PCT Filed: Sep. 20, 2013

(86) PCT No.: PCT/DK2013/050302
§ 371 (c)(1),
(2) Date: Mar. 16, 2015

(87) PCT Pub. No.: WO2014/044285
PCT Pub. Date: Mar. 27, 2014

(65) Prior Publication Data
US 2015/0222002 A1   Aug. 6, 2015

(30) Foreign Application Priority Data

Sep. 21, 2012 (EP) .................................. 12185411

(51) Int. Cl.
| | |
|---|---|
| H02J 7/00 | (2006.01) |
| H01M 12/08 | (2006.01) |
| C25B 1/00 | (2006.01) |
| C25B 1/02 | (2006.01) |
| H01M 8/1233 | (2016.01) |
| H01M 8/243 | (2016.01) |
| H01M 4/96 | (2006.01) |
| H01M 8/2425 | (2016.01) |

(52) U.S. Cl.
CPC .............. *H01M 12/08* (2013.01); *C25B 1/00* (2013.01); *C25B 1/02* (2013.01); *H01M 4/96* (2013.01); *H01M 8/1233* (2013.01); *H01M 8/243* (2013.01); *H02J 7/00* (2013.01); *H01M 8/2425* (2013.01); *H01M 2300/0074* (2013.01); *Y02E 60/128* (2013.01)

(58) Field of Classification Search
CPC ......... Y02E 60/12; H02J 7/0068; H02J 7/022; H02J 7/0031; H01M 10/44
USPC ...................................................... 320/128
See application file for complete search history.

(56) References Cited

U.S. PATENT DOCUMENTS

| | | | |
|---|---|---|---|
| 5,376,469 A | 12/1994 | Gür | |
| 5,492,777 A * | 2/1996 | Isenberg | C01B 3/061 429/221 |
| 6,183,896 B1 | 2/2001 | Horita et al. | |
| 7,572,530 B2 | 8/2009 | Gottmann et al. | |
| 7,745,026 B2 | 6/2010 | Fan et al. | |
| 7,781,112 B2 | 8/2010 | Sridhar et al. | |
| 2002/0015877 A1 | 2/2002 | Tao | |
| 2002/0025456 A1 * | 2/2002 | Gieshoff | H01M 8/0662 429/2 |
| 2002/0106549 A1 * | 8/2002 | Cooper | H01M 2/1653 429/464 |
| 2002/0172851 A1 * | 11/2002 | Corey | H01M 8/04156 429/414 |
| 2004/0197618 A1 * | 10/2004 | Harada | B01J 8/0453 429/412 |
| 2004/0219400 A1 * | 11/2004 | Al-Hallaj | C02F 1/041 429/424 |
| 2004/0224193 A1 * | 11/2004 | Mitlitsky | H01M 8/04052 429/411 |
| 2006/0102468 A1 * | 5/2006 | Monzyk | B01D 53/62 204/242 |
| 2007/0065686 A1 | 3/2007 | Fan et al. | |
| 2009/0004529 A1 | 1/2009 | Gur et al. | |
| 2013/0036670 A1 * | 2/2013 | McAlister | C10L 1/00 48/197 |

FOREIGN PATENT DOCUMENTS

| | | |
|---|---|---|
| CN | 1679203 A | 10/2005 |
| CN | 101540411 A | 9/2009 |
| JP | 2010-3568 A | 1/2010 |
| WO | WO 03/044887 A2 | 5/2003 |
| WO | WO 2006/113674 A2 | 10/2006 |
| WO | WO 2007/025762 A2 | 3/2007 |

OTHER PUBLICATIONS

Ebbesen, Sune Dalgaard et al., "Electrolysis of carbon dioxide in Solid Oxide Electrolysis Cells" Journal of Power Sources, 2009, pp. 349-358, vol. 193.
Graves, Christopher et al., "Co-electrolysis of $CO_2$ and $H_2O$ in solid oxide cells: Performance and durability" Solid State Ionics, 2011, pp. 398-403, vol. 192.
Ihara, Manabu et al., "Quickly Rechargeable Direct Carbon Solid Oxide Fuel Cell with Propane for Recharging" Journal of the Electrochemical Society, 2006, pp. A1544-A1546, vol. 153, No. 8.
International Search Report for PCT/DK2013/050302 dated Jun. 12, 2015.

* cited by examiner

*Primary Examiner* — Arun Williams
(74) *Attorney, Agent, or Firm* — Knobbe Martens Olson & Bear LLP

(57) ABSTRACT

The invention relates to a rechargeable battery and a method to operate a rechargeable battery having high efficiency and high energy density for storing energy. The battery stores electrical energy in the bonds of carbon and oxygen atoms by converting carbon dioxide into solid carbon and oxygen.

17 Claims, 14 Drawing Sheets

85

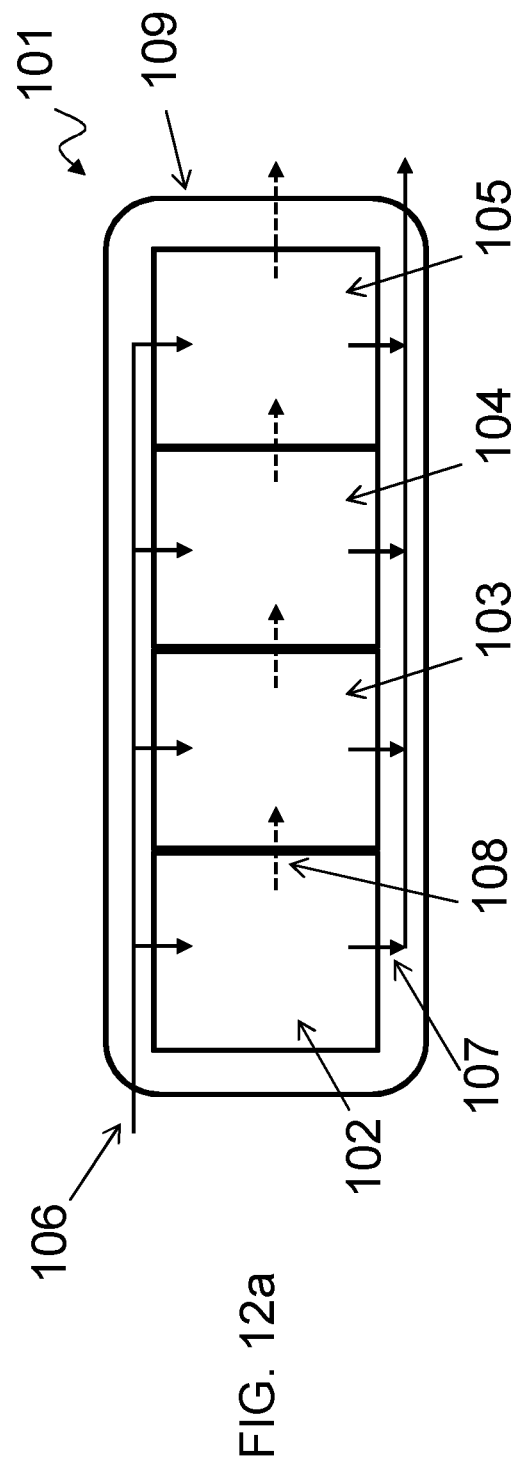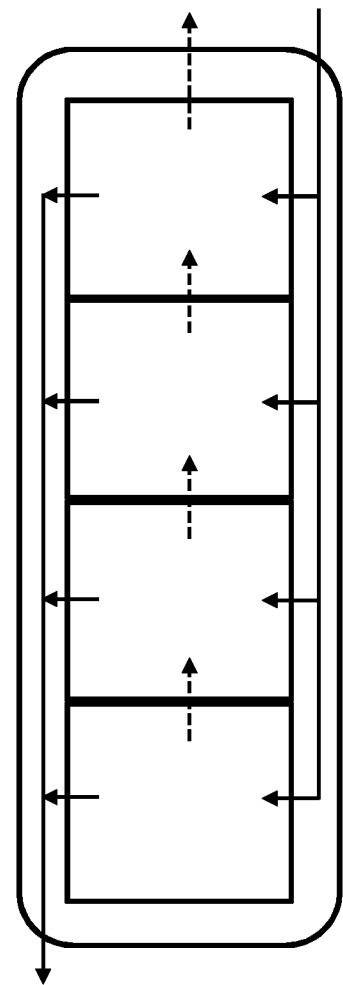
FIG. 12a
FIG. 12b

RECHARGEABLE CARBON-OXYGEN BATTERY

CROSS REFERENCE TO RELATED APPLICATIONS

This application is a U.S. National Phase Application of PCT International Application Number PCT/DK2013/050302, filed on Sep. 20, 2013, designating the United States of America and published in the English language, which is an International Application of and claims the benefit of priority to European Patent Application No. 12185411.1, filed on Sep. 21, 2012. The disclosures of the above-referenced applications are hereby expressly incorporated by reference in their entireties.

FIELD OF THE INVENTION

The present invention relates to electrochemical devices, such as rechargeable batteries. In particular, the invention relates to a rechargeable battery and to methods to operate the battery for storage of electrical energy in chemical bonds.

BACKGROUND OF THE INVENTION

Rechargeable batteries are electrochemical devices that can provide electricity by being discharged, and are able to be charged by storing electricity, e.g. produced by different energy sources, for later use. Thus, rechargeable batteries solve the problem of discontinuous production of electrical energy, especially when produced by renewable power sources like solar or wind, and allow for storing electrical energy when the electricity supply does not match the electricity demand.

Examples of rechargeable batteries are flow batteries or Li-ion batteries. Another example of rechargeable batteries may be metal air batteries such as Li-air batteries. These batteries are based on the use of the oxidation of a metal such as lithium at the anode and reduction of a gas such as oxygen at the cathode to induce a current flow. All such batteries have the disadvantage that the energy is stored in expensive metal atoms, and except for flow batteries, these atoms are stored in the electrodes where the electrochemical reactions occur, which limits the storage capacity and energy density.

Reversible fuel cells (RFCs) may also be used for electricity storage. RFCs, such as reversible solid oxide electrochemical cells (RSOECs), can be operated in electrolysis mode to convert electrical energy into fuel and in fuel cell mode to convert fuel into electrical energy. RFCs can thus operate in a similar manner as a flow battery. RFCs advantageously store energy in inexpensive hydrogen and hydrocarbon fuels which are stored outside of the cells. Metals are only used in the materials comprising the cells, to provide reaction sites where the electrochemical reactions occur. However, since RFCs operate with gases, they have the drawback of needing voluminous tanks or containers to store reactants and products, making their energy density low. Further, RFCs have a low efficiency compared with the batteries mentioned above.

CN 101540411 discloses a solid electrolyte direct carbon fuel cell where carbon fuel is filled in a tube-type battery. Once exhausted the carbon fuel needs to be refilled and carbon must be supplied by an external source.

JP 2010/003568 discloses a rechargeable direct carbon fuel cell where solid carbon is produced by thermal decomposition of hydrocarbon fuel. JP 2010/003568 discloses the use of parallel cells for continuous power generation. JP 2010/003568 discloses two cells connected in parallel, wherein the first cell supports solid carbon particles. Upon feeding oxygen gas, the first cell produces electricity and consumes carbon. Simultaneously with the power generation an organic compound is circulated in a passage in contact with the anode of the second cell where the organic compound decomposes so as to form solid carbon particles. When the carbon of the first cell is exhausted the circuit is switched so that the second cell becomes operative in the production of electricity. Ihara et al. (J. Electrochem. Soc. 2006, volume 153, pages 1544-1546) disclose a solid oxide fuel cell that uses solid carbon fuel supplied by the thermal decomposition of propane.

None of the fuel cells disclosed may be used as a rechargeable battery, i.e. may be used to store electrical energy.

The fuel cell of CN 101540411 needs to be re-supplied with solid carbon once the carbon is consumed so as to keep producing electricity. In the fuel cell of CN 101520411 carbon is not regenerated using electrical energy and to keep working the fuel cell needs to be opened and supplied with carbon from an external source.

The fuel cell of JP 2010/003568 allows for continuous power generation by switching the contacts between the different fuel cells. However, the fuel cell of JP 2010/003568 is not suitable for storing electrical energy. Ihara et al. uses thermal decomposition of propane to refill the solid oxide fuel cell so as to continue to produce electricity. However, the fuel cell of Ihara et al. is not suitable for storing electrical energy.

Hence, an improved rechargeable battery, i.e. a battery that can store a surplus of electrical energy would be advantageous, and in particular a rechargeable battery having higher energy density would be advantageous.

A more reliable and versatile rechargeable battery would also be advantageous, and in particular a rechargeable battery having a high round trip electrical energy storage efficiency would also be advantageous.

OBJECT OF THE INVENTION

It is an object of the present invention to provide a rechargeable battery with high round-trip electrical energy storage efficiency.

It may be also seen as an object of the invention to provide a rechargeable battery having a high energy density, significantly higher than existing batteries and other RFCs.

A further object of the invention is to provide a low cost rechargeable battery.

It is an even further object of the present invention to provide an alternative to the prior art.

In particular, it may be seen as an object of the present invention to provide a rechargeable battery that solves the above mentioned problems of the prior art by storing electrical energy into chemical bonds.

SUMMARY OF THE INVENTION

Unlike typical battery technology, where the energy is stored in the bonds of metal atoms which are stored on the electrodes of the battery cells, the invention provides an electrochemical device where electrical energy is converted and stored in the chemical bonds of carbon and oxygen molecules which are stored in reservoirs.

This has several advantages as expensive metal atoms are only used to catalyse the carbon-oxygen reactions and not for storing energy. Indeed a much lower quantity of expensive material is used to store energy in the carbon-oxygen battery than the quantity used in typical batteries.

By storing energy in carbon and oxygen molecules, a rechargeable battery having a maximum theoretical efficiency of 100%, an expected efficiency of 80-95% and a high energy density, such as between 900-4200 Wh/L depending on the pressure, i.e. between 1-100 bars, is produced. Thus, one of the great advantages of the invention is the ability to store electrical energy with high efficiency and energy density when the electricity supply does not match the electricity demand.

The above described object and several other objects are intended to be obtained in a first aspect of the invention by providing an electrochemical device comprising: a stack of electrochemical cells and means for converting at least one of the products produced by the stack of electrochemical cells.

In some embodiments, the electrochemical device according to the first aspect of the invention further comprises means for storing the at least one of the converted products produced by the stack of electrochemical cells.

By operating the stack of electrochemical cells at least one of the products produced is stored within the electrochemical device.

In some further embodiments the means for converting at least one of the products produced by the stack of electrochemical cells is integrated in the electrochemical cell.

The means for storing the at least one of the converted products produced by the stack of electrochemical cells may be integrated in the electrochemical device.

In some embodiments according to the first aspect of the invention the means for converting the at least one of the products produced by the stack of electrochemical cells is or comprises the means for storing said at least one of the converted products produced by the stack of electrochemical cells.

In some further embodiments the at least one of the converted product is in its solid form.

In some embodiments the at least one of the converted products is or comprises carbon.

In a second aspect of the invention the above described object and several other objects are intended to be obtained by providing an electrochemical device comprising: a stack of electrochemical cells; means for converting at least one of the products produced by the stack of electrochemical cell; and means for storing the at least one of the converted products produced by the stack of electrochemical cells.

Storing the converted product within the electrochemical device allows for an efficient heat exchange within the device between the reactions occurring during the charging or discharging processes.

In some embodiments the at least one of the converted product is in its solid form. Thus, an electrochemical device according to the second aspect of the invention further comprises means for converting at least one of the products produced by the stack of electrochemical cells into its solid form.

In some other embodiments the at least one of the converted products is or comprises carbon.

The conversion to solid carbon allows for easy storage within the electrochemical device as the product is converted into a solid form that requires limited storage capacity.

A further advantage of the invention is that by converting the product into a solid form, the product has more stability as it can be stored in safety and therefore for a longer period.

In some embodiments the stored converted product can be removed from the rechargeable battery so as to be employed outside the electrochemical device.

In some further embodiments the stored converted product can be exchanged between electrochemical devices. In some embodiments the solid carbon is provided through an external source and not produced by the conversion of at least one of the product produced by the stack of electrochemical cells.

In some further embodiments the means for converting at least one of the products produced by the stack of electrochemical cells is integrated in the electrochemical device.

In some further embodiments the means for storing the at least one of the converted products produced by the stack of electrochemical cells is integrated in the electrochemical device.

Integrated is herein defined as incorporated into the electrochemical device so as to produce a whole, complete and new device where the separate elements are combined and coordinated. Thus, as described throughout the text, integration of the means for storing and of the means for converting the product in the electrochemical device cannot be considered as simple juxtaposition.

The integration of the means for converting and storing into the electrochemical device allows for optimization of the heat exchange between the conversion reactions occurring within the electrochemical device.

For example the following chemical reaction takes place during the charge mode, while the reverse take place in discharge mode:

$$2CO_2 + electricity + heat \rightarrow 2CO + O_2; \qquad 1)$$

$$2CO \rightarrow C + CO_2 + heat. \qquad 2)$$

The first reaction is the electrolysis of carbon dioxide occurring at the negative electrodes of the electrochemical cells. The second reaction is a catalytic reaction, known as the Boudouard reaction, which leads to the formation of carbon particles. As the means for converting and storing are integrated into the electrochemical cell, the heat produced by the second reaction is supplied to the first reaction, thus in the electrochemical device of the invention a high efficiency is obtained by taking advantage of the low entropy change of the net reaction. For example, in the charge mode the exothermic conversion of carbon monoxide into solid carbon may complement the endothermic conversion of carbon dioxide into carbon monoxide and oxygen. Indeed the device of the invention achieves an optimal heat balance as the heat produced by the Boudouard conversion reaction of carbon monoxide into solid carbon can be transferred and therefore contribute towards driving the reaction converting carbon dioxide into carbon monoxide. Optimal heat balance is achieved also when the stack of electrochemical cells is operated in discharge mode. In this case the heat necessary to drive the gasification of carbon particles into carbon monoxide is provided by the exothermic reaction converting carbon monoxide into carbon dioxide.

The electrochemical cell stack is designed to facilitate efficient heat transfer between the catalytic and the electrochemical reaction in both operational modes.

The electrochemical cell stack may comprise the means for converting the at least one of the products produced and may also comprise the means for storing the at least one of the converted products produced. The stack of electrochemical cells may consist of electrochemical cells having different surfaces that can come in contact with mixtures of carbonaceous gasses, e.g. $CO_2$ and $CO$. These surfaces may be composed of different materials designed to catalyse the second reaction, i.e. the Boudouard reaction, in certain locations, while not to catalyse the second reaction in other locations. For example the electrodes may be designed to not catalyse the Boudouard reaction so that the carbonaceous gasses in the electrode are not converted into solid carbon.

In some further embodiments the electrochemical cell is a solid oxide cell.

In some even further embodiments the means for converting the at least one of the products produced by the stack of electrochemical cells is or comprises the means for storing the at least one of the converted products produced by the stack of electrochemical cells.

In some embodiments the means for converting and/or storing the converted product may be comprised in one of the electrodes or interconnects. In some other embodiments the means for converting and/or storing the converted product may not be comprised in one of the electrodes and thus may be located between electrodes, as an extra layer, or adjacent to the stack of electrochemical cells in the form of a holder. Thus it may be so that the means for converting has also the function of storing the converted product.

Converted product is herein defined as a product that undertakes a chemical reaction that transforms it into a different chemical compound, e.g. from $CO_2$ to solid carbon and oxygen. Thus converted may be intended as chemically converted and not merely transformed into a different state of matter, i.e. from gas to liquid. Converted product is herein referred to solid carbon, such as carbon particles. Thus converted product may refer to solid carbon produced by the Boudouard conversion reaction occurring in the electrochemical device. However, as the means for converting and storing may be modular and removable, converted product may refer herein to solid carbon produced by an external source and provided to the electrochemical device and therefore not only produced by the electrochemical device.

In some further embodiments the means for storing the at least one of the converted products produced by the stack of electrochemical cells is a carbon holder.

A carbon holder according to some embodiments of the invention may be a cartridge, such as a carbon cartridge for holding carbon particles produced when the electrochemical device is operated in charge mode. The catalytic Boudouard reaction may be carried out in the carbon cartridge. Thus, the cartridge may have also the function of a reaction chamber with surfaces that catalyse the Boudouard reaction. For example, the cartridge may contain a fluidized bed of catalysts and carbon particles formed during the conversion of carbon monoxide.

The cartridge may be removable and thus may be easily exchangeable within different devices. The cartridge may also be refilled with solid carbon produced by an external source outside the electrochemical device and then inserted so as to provide an electrochemical device ready for discharging.

In some embodiments the means for storing the at least one of the converted products produced by the stack of electrochemical cells is in the form of an interlayer between at least two of the single repeating units, i.e. electrochemical cells, of the stack of electrochemical cells.

The single repeating unit comprises a porous positive electrode and a porous negative electrode that are separated by a dense layer of electrolyte. The unit or electrochemical cell so formed is sandwiched between two dense layers of interconnects. Thus, a stack of electrochemical cells may be also referred to as a stack of single repeating units.

In some further embodiments the at least one of the converted products produced by the stack of electrochemical cells is carbon in its solid state.

The conversion to solid carbon allows for easy storage within the electrochemical device as the product is converted into a solid form. A further advantage is that by converting it into a solid form the product has more stability as it can be stored in safety and for a longer period.

In some embodiments the means for converting the at least one of the products is in thermal contact with the stack of electrochemical cells. Thus efficient heat transfer is possible between the electrodes of the electrochemical cells and the means for converting at least one of said products In some further embodiments the means for storing the at least one of the products is in thermal contact with the stack of electrochemical cells.

Thereby, the heat produced during the conversion and storage of at least one of the product produced by the stack of electrochemical cells is fed to the stack of electrochemical cells.

Thermal contact may be direct contact or indirect contact, thereby allowing for heat exchange between the two bodies, i.e. the stack of electrochemical cells and the carbon holder where the reactions take place.

In some embodiments each electrochemical cell in the stack of electrochemical cells comprises a solid state electrolyte layer. The solid state electrolyte layer allows for conduction of oxygen ions.

The electrochemical device may be referred to also as a rechargeable battery.

The electrochemical device is a rechargeable battery adapted to be charged by feeding electricity and a reactant to the rechargeable battery and to be discharged by transforming at least one of the converted products previously stored or externally supplied. The rechargeable battery thus allows for storage of electrical energy, for example when electricity production does not match electricity demand.

In a third aspect of the invention a method of operating a rechargeable battery is provided, the method comprising: charging the rechargeable battery by feeding electricity to the rechargeable battery; discharging the rechargeable battery by transforming at least one of the converted products previously stored or externally supplied.

By operating the device in charge mode, the rechargeable battery can store electrical energy, for example from wind power, during period of high production and low use, e.g. at night. This energy stored can be reused by operating the device in discharge mode.

The rechargeable battery is suitable for being operated in both charge mode and discharge mode during its lifetime, or may be operated only in one of the modes to obtain a net consumption or production of electricity.

As the carbon holder may be removable and the charging process is meant to provide the holder with the carbon, charge mode and discharge mode may be achieved by, e.g. inserting a carbon cartridge that was filled with carbon supplied from an external source or removing carbon product from the battery for external uses respectively. This latter charge and discharge mode may be also referred to as a mechanical charging and discharging operational mode.

In a fourth aspect of the invention a method for charging the rechargeable battery, according to the first and second aspect of the invention, is provided, the method comprising: operating, in a first mode the stack of electrochemical cells by feeding a reactant and electricity to the stack of electrochemical cells; and converting and storing the at least one of the products into solid carbon.

In a fifth aspect a method for operating a stack of electrochemical cells comprising means for converting and storing at least one of the products produced by the stack of electrochemical cells is provided, the method comprising: operating in a first mode the stack of electrochemical cells by feeding a reactant, and electricity to the stack of electrochemical cells, thereby producing gases; and converting and storing the at least one of the products into solid carbon. The reactants may be a gas such as $CO_2$. The gasses produced may be $O_2$ and CO.

In this operation mode, i.e. first mode or charge mode, the rechargeable battery can store electrical energy, for example from wind power, during periods of high production and low consumption, e.g. at night. The electrical energy is stored in bonds of carbon and oxygen atoms. Electricity and carbon dioxide are electrochemically converted to solid carbon particles and oxygen in the charge mode. The conversion to solid carbon particles may occur by first producing carbon monoxide and oxygen and in turn converting and storing the carbon monoxide as carbon particles.

The device used by the method is also characterized by high efficiency as the heat produced during the Boudouard conversion reaction is used to promote the electrochemical reaction producing $O_2$ and CO.

In a sixth aspect of the invention a method for discharging the rechargeable battery according to the first and second aspect of the invention is provided, the method comprising: feeding gas to the means for converting and storing at least one of the products produced by the stack of electrochemical cells; transforming the at least one of the converted products into gas and providing said gas to the stack of electrochemical cells; and operating the stack of electrochemical cells in a second mode thereby producing electricity.

In another aspect of the invention a method for reversibly operating a stack of electrochemical cells comprising means for converting and storing at least one of the products produced by the stack of electrochemical cells is provided, the method comprising: feeding gas, such as air or $O_2$ to the means for converting and storing the at least one of the products produced by the stack of electrochemical cells; transforming the at least one of the previously converted products into gas, such as a $CO_2/CO$ blend, to be fed to the stack of electrochemical cells; and operating the stack of electrochemical cells in a second mode, or discharge mode, thereby producing electricity and $CO_2$.

In this second operation mode, i.e. second mode or discharge mode, the net reaction occurring in the charge mode is reversed. By feeding oxygen to the means for storing the carbon particles a gas blend, such as carbon dioxide/monoxide, is produced, which in turn is converted to carbon dioxide and electricity by operating the electrochemical cell in a discharge mode. The heat produced during the electricity production is used to promote the Boudouard gasification reaction.

The first, second and other aspects and embodiments of the present invention may each be combined with any of the other aspects and embodiments. These and other aspects of the invention will be apparent from and elucidated with reference to the embodiments described hereinafter.

BRIEF DESCRIPTION OF THE FIGURES

The rechargeable battery according to the invention will now be described in more detail with regard to the accompanying figures. The figures show some ways of implementing the present invention and are not to be construed as limiting to other possible embodiments falling within the scope of the attached claim set.

FIG. 4 is a schematic drawing of the electrochemical device according to one embodiment of the invention where the means for converting and storing the product is a holder, such as a carbon holder for holding carbon particles. The electrochemical device is shown as operating in its charge mode, i.e.

FIG. 5 is a schematic drawing of the electrochemical device according to one embodiment of the invention where the means for converting and storing the product is comprised in the interconnect layer. The electrochemical device is shown as operating in its charge mode, i.e.

FIG. 6 is a schematic drawing of the electrochemical device according to one embodiment of the invention where the means for converting and storing the product is an interlayer between the negative electrode and the interconnect layer. The electrochemical device is shown as operating in its charge mode, i.e.

FIGS. 7b and 7c are schematic drawings of the electrochemical device according to one embodiment of the invention characterized by a single repeating unit 70 as shown in FIG. 7a.

FIG. 8 is a schematic drawing of the electrochemical device according to one embodiment of the invention where the means for converting and storing the converted product is comprised in the negative electrode. The electrochemical device is shown as operating in its charge mode, i.e.

FIGS. 9b and 9c are schematic drawings of the electrochemical device according to one embodiment of the invention characterized by a single repeating unit 85 as shown in FIG. 9a.

FIG. 12 is a schematic drawing of the electrochemical device according to one embodiment of the invention where several batteries are operated at different temperatures and arranged so that heat is transferred between adjacent batteries.

DETAILED DESCRIPTION OF AN EMBODIMENT

Figure 1:
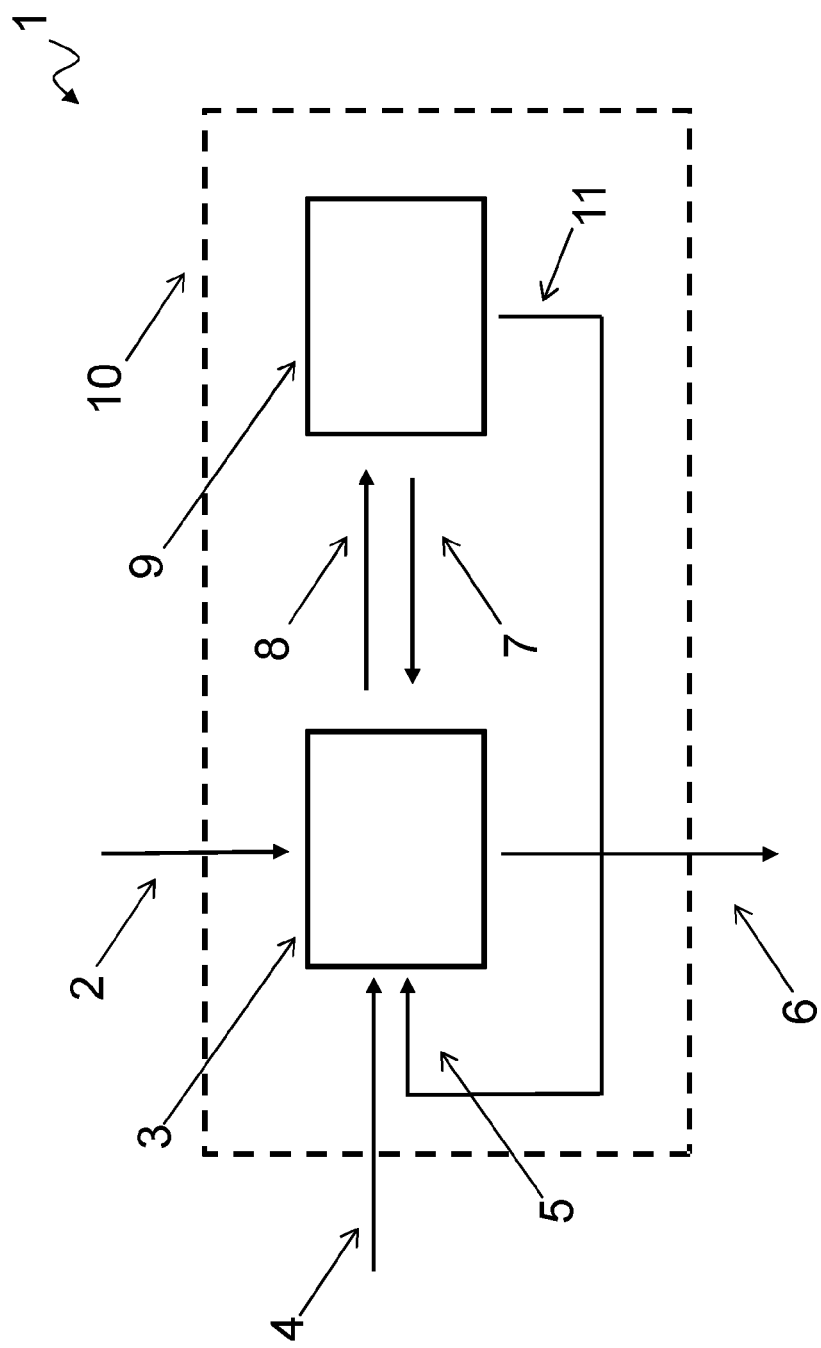
FIG. 1 is a schematic drawing of the electrochemical device according to one aspect of the invention when operated in charge mode.

FIG. 1 is a schematic drawing of the electrochemical device, such as a rechargeable battery, according to one aspect of the invention when operated in charge mode. The two main components 3 and 9 of the rechargeable battery 1 are illustrated in FIG. 1. During charge mode, the $CO_2$ electrolysis reaction is carried out in the electrochemical cell or stack of electrochemical cells 3 and the catalytic Boudouard reaction is carried out in the carbon holder 9. Thus the holder 9 is a reaction chamber with surfaces that catalyse the Boudouard reaction. The holder may contain a fixed bed or fluidized bed of catalyst and carbon particles.

During charging, the rechargeable battery 1 is fed with carbon dioxide 4 and the electrochemical cell 3 is operated in charge mode. Thus, upon feeding electricity 2 to the electrochemical cell 3, CO gas 8 and oxygen gas 6 are produced. Oxygen gas 6 is released out of the rechargeable battery 1 and may be stored to be used during the discharging of the rechargeable battery. The product CO gas 8 is converted into solid carbon in the holder 9, i.e. by the Boudouard reaction carbon monoxide is converted into solid carbon and carbon dioxide 11 in holder 9. The carbon dioxide 11 may be reused directly within the rechargeable battery and fed back 5 to the electrochemical cell 3. The Boudouard reaction producing solid carbon 9 and $CO_2$ 11 is an exothermic reaction. Thus heat 7 is released during the Boudouard conversion. This heat 7 may be advantageously employed directly within the rechargeable battery because the reaction occurring in the stack of electrochemical cells 3 during the recharging of the rechargeable battery is endothermic. Indeed during the operation of the electrochemical cell in electrolysis mode, heat is needed to convert $CO_2$ into CO and oxygen gas because the electrochemical cell is operated below the thermoneutral potential of the electrolysis of $CO_2$ to CO. As both conversion of $CO_2$ into CO and into solid carbon occur within the internal area 10 of the battery 1, thermal exchange is advantageously employed in optimizing the device.

Figure 2:
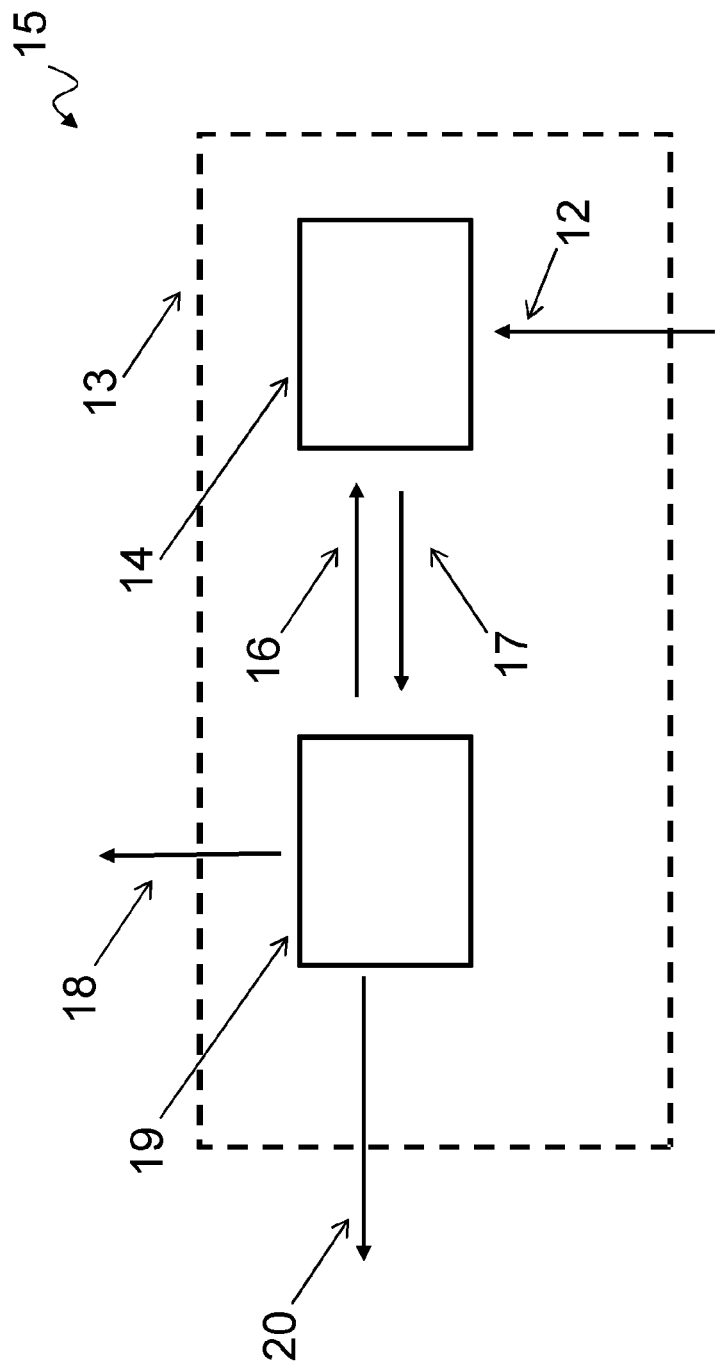
FIG. 2 is a schematic drawing of the electrochemical device according to one aspect of the invention when operated in discharge mode.

FIG. 2 is a schematic drawing of the electrochemical device according to one aspect of the invention when operated in discharge mode.

During discharging, the rechargeable battery 15 is fed with oxygen gas 12 and the solid carbon contained in the holder 14 is gasified by the Boudouard reaction into a blend of CO and $CO_2$ 17. This blend of gasses is fed to the electrochemical cell 19 where it is converted into $CO_2$ 20 that is released outside the battery 15. The $CO_2$ may be stored to be used during the recharging of the battery. The $CO_2$ may be stored in gas form, liquid form, or reacted with a material to obtain a solid or liquid carbonate. In some embodiments the means for storing $CO_2$ may be integrated in the rechargeable battery, e.g. a container for the $CO_2$ or $CO_2$-containing material may be attached to the outside wall of the stack of electrochemical cells.

By operating the electrochemical device in discharge mode, electricity 18 is produced. The conversion of CO into $CO_2$, occurring when operating the electrochemical cell 19 in discharge mode, is an exothermic reaction. Thus heat 16 can be advantageously exchanged and used by the endothermic reaction converting solid carbon in the holder 14 into a gas blend 17.

Figure 3:
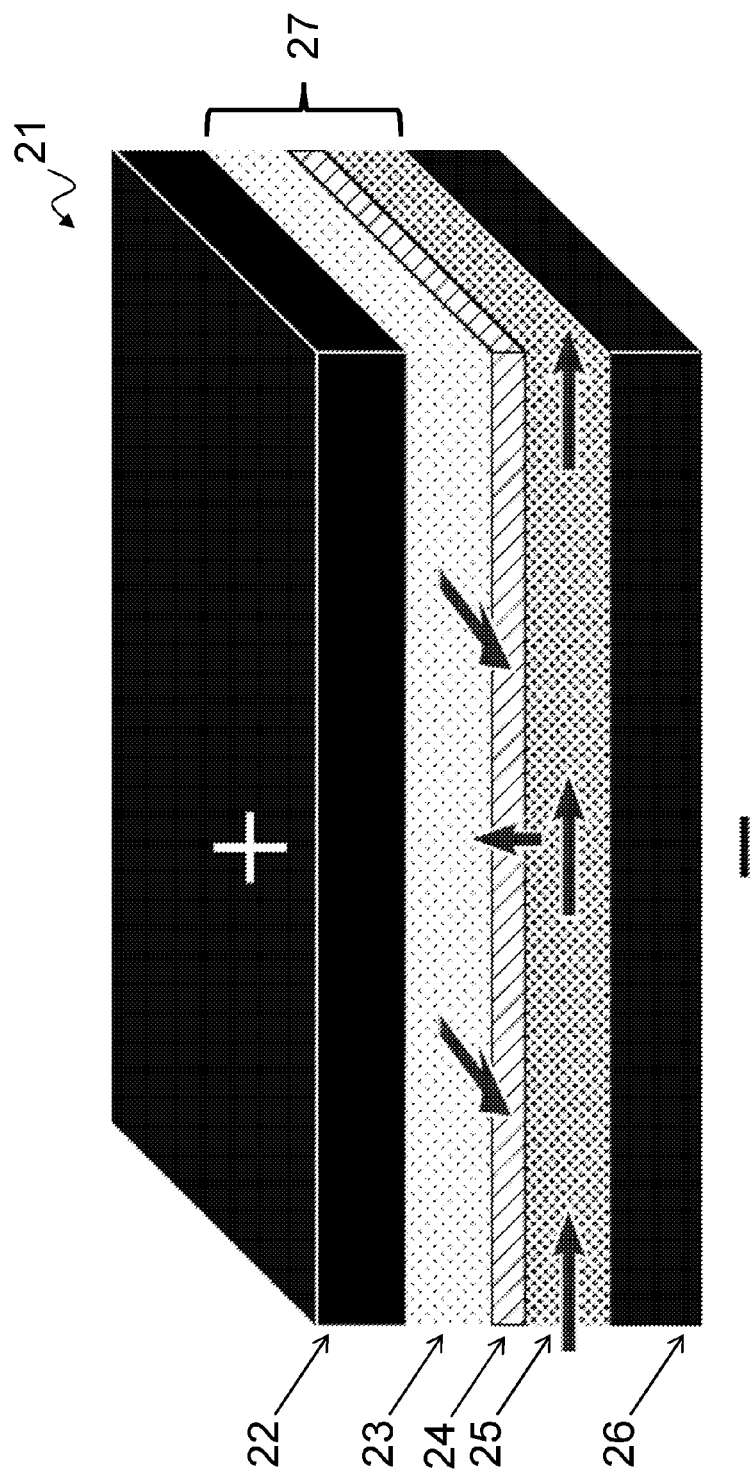
FIG. 3 is a schematic drawing of the single repeating unit of the stack of electrochemical cells according to one embodiment of the invention.

FIG. 3 is a schematic drawing of the single repeating unit of the stack of electrochemical cells according to one embodiment of the invention.

The rechargeable battery of the invention comprises a stack of electrochemical cells manufactured by stacking single repeating units as shown in FIG. 3. The single repeating unit 21 consists of a porous positive electrode 23 and a porous negative electrode 25 that are separated by a dense layer of electrolyte 24. The cell 27 is sandwiched between two dense layers of interconnects 22 and 26. FIG. 3 shows the gas flow direction during the charge mode, i.e. a mixture of $CO_2$ and CO flows through the porous negative electrode 25 where $CO_2$ is converted into CO and oxide ions. The oxide ions are transported across the electrolyte 24 and form $O_2$ gas that flows out of the porous positive electrode 23. The single repeating unit may have further layers such as a carbon holder layer and support/current collecting layers. The single repeating unit may also comprise the carbon holder as an integrated layer.

The interconnects 22 and 26 may be composed of steel coated with a material that does not catalyze the Boudouard reaction. The electrolyte 24 may be composed of any suitable oxide ion conductor such as yttria/scandia stabilized zirconia, lanthanum strontium gallate magnesite, and rare earth doped ceria. The negative electrode 25 may comprise an electron-conducting material and ceria doped with rare earth elements such as Gd, Sm, Pr, La, Y, and Yb and/or other elements such as Mn and Fe. The electron-conducting material may be mixed with the doped ceria or it could form a porous scaffold composed in which the surfaces are coated with nanoparticles of doped ceria. The electron-conducting material may be composed of ceramic oxides such as Sr-doped lanthanum chromite, Nb-, La- or Y-doped strontium titanate, and strontium iron molybdate, or metals such as copper and silver. Alkali carbonate material may be added to the negative electrode which may be molten while operating the rechargeable battery. The surfaces of the negative electrode are active for the electrochemical reaction and inactive for the Boudouard reaction. The positive electrode 23 may be composed of any suitable oxygen electrode such as Sr-doped lanthanum cobalt ferrite. For certain positive electrode materials, a dense layer of rare-earth doped ceria will be applied between the electrolyte and the positive electrode.

Figures 4A, 4B:
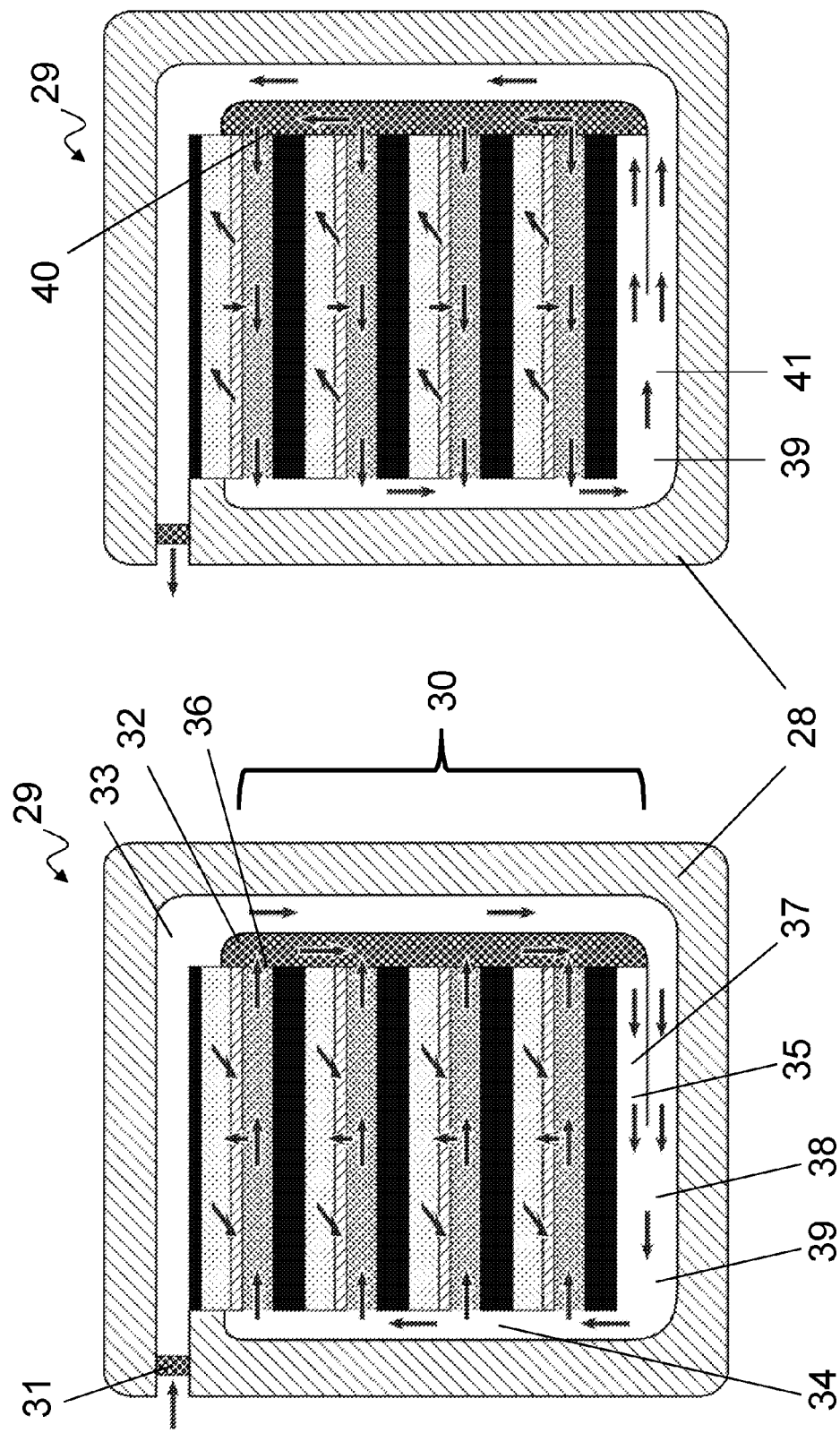
FIG. 4a, and discharge mode, i.e.
FIG. 4b.

FIG. 4 is a schematic drawing of the electrochemical device according to one embodiment of the invention where the means for storing the converted product is a holder, such as a carbon holder for holding carbon particles. The rechargeable battery 29 is shown as operating in its charge mode, i.e. FIG. 4a, and discharge mode, i.e. FIG. 4b. The single repeating units 21 are stacked inside the battery 29. The battery 29 comprises an insulation layer 28 surrounding the stack 30 of units 21. The battery 29 comprises also an inlet 31 for carbon dioxide or mixture of carbon dioxide and carbon monoxide to enter the battery. The battery 29 is characterized by the presence of a carbon holder 32. In general the carbon holder 32 may have the function of storing carbon particles, either produced or provided from an external source, or it may have the function of converting the carbon particles produced during the recharging of the battery, or both functions. The carbon holder 32, as shown in FIG. 4, has the function of storing and converting the carbon particles produced during the recharging of the battery 29. The holder is shown in FIGS. 4a and 4b as attached to the side of the stack. However other positions are possible that lie within the person skilled in the art. During recharging, the carbon dioxide entering the inlet 31 flows through channels 33 and 34 and enters the units 21 through negative electrode 25. There $CO_2$ is converted into $O_2$ and CO that in turn is converted into carbon particles within the holder 32 and stored into holder 32. The oxygen produced at the positive electrode 23 during the conversion of $CO_2$ is released along a path flow normal to the path flow of the $CO_2$ entering the single repeating unit. The holder 32 has the function of storing carbon particles and allows for gas flow, thus the $CO_2$ produced in the Boudouard conversion of CO into carbon can be recycled through channel 35.

Through the operation of the battery the composition of the gases flowing through the holder and the stack of oxide cells may change. In particular, different ratios of $CO/CO_2$ may flow through the holder 32, channel 35 and 34 due to the reactions occurring in the stack. For example, at point 36 the ratio of $CO/CO_2$ may be 77/23, at point 37, it may be 33/67 and at point 38, 25/75.

FIG. 4b shows the battery 29 operated in the discharging mode. Gasification of the solid carbon occurs in the holder 32 and CO is produced within the holder 32 which in turn is converted into $CO_2$ in the stack 30. As described in relation to the charge mode the composition of the gases flowing through the holder and the stack of oxide cells may change. In particular different ratio of $CO/CO_2$ may flow through the holder 32 and channel 39 due to the reactions occurring in the stack. For example at point 40 the ratio $CO/CO_2$ may be 33/67, at point 41, it may be 10/90. FIG. 4b shows also the flow of gases through the stack which is reversed in comparison to the flow during recharging of the battery. The final product, during discharge, is $CO_2$ that is released outside the battery through outlet 31, i.e. the inlet during recharging mode. In some embodiments the gas released maybe a blend of gases, e.g. $CO/CO_2$ 10/90.

The carbon holder 32 may comprise carbon particles and catalyst particles that catalyze the reversible Boudouard reaction. The catalyst particles may be composed of one or more materials including alkali elements such as K and Na which form carbonates within the holder, the metals Fe, Co and Ni, their carbides, their alloys with any other suitable metals, and their oxides. The operating temperature and pressure of the battery may be between 400-900° C. and 1-100 atm.

In some embodiments the means for storing or the means for converting and storing the converted product may be comprised in one of the electrodes or interconnects. In some other embodiments the means for converting and storing the converted product may not be comprised in one of the electrodes and thus may be located between electrodes, as an extra layer, or on the side, such as a holder.

Figure 5B:
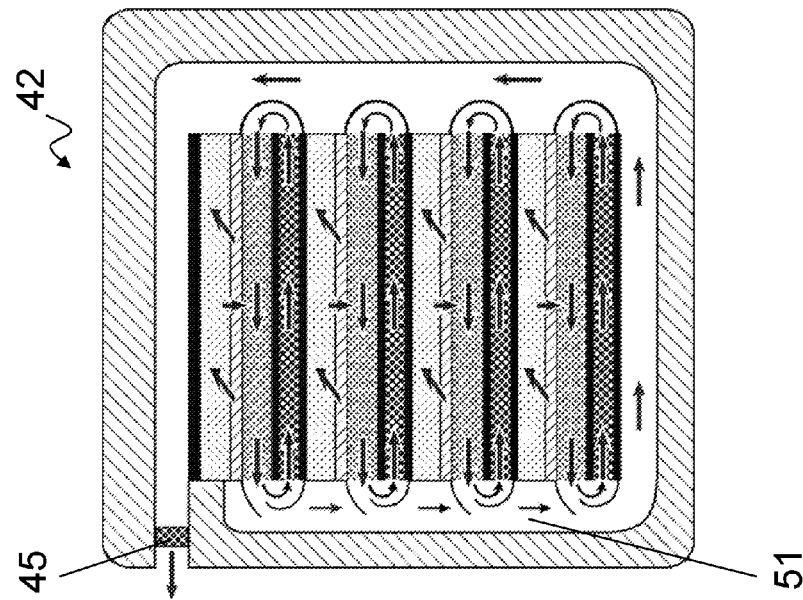
FIG. 5b.
Figure 5A:
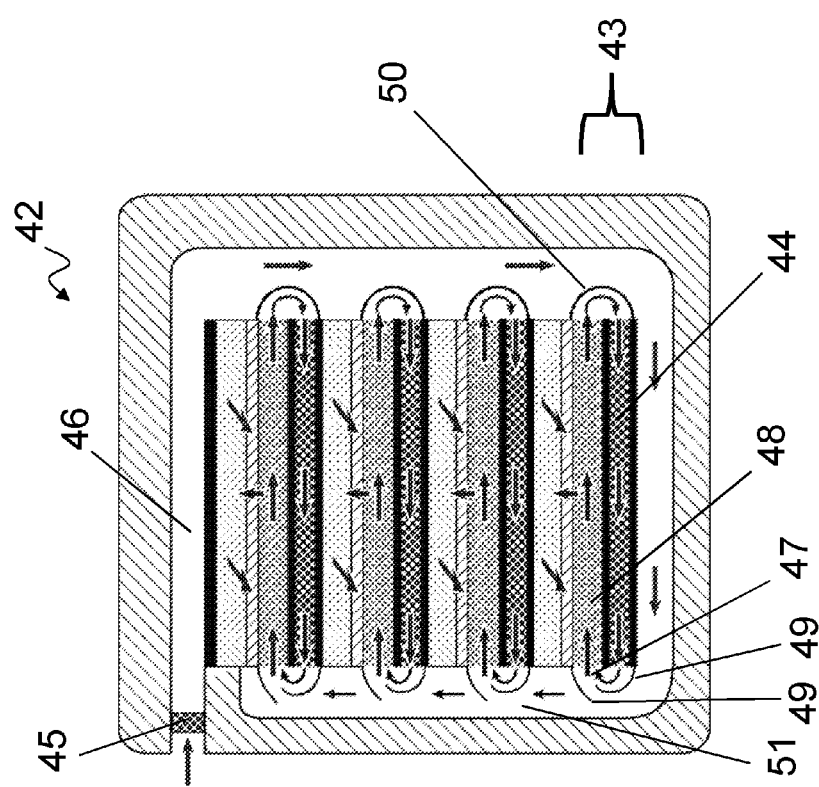
FIG. 5a, and discharge mode, i.e.

FIG. 5 is a schematic drawing of the electrochemical device according to one embodiment of the invention where the means for converting and storing the converted product is comprised in the interconnect layer. The electrochemical device is shown as operating in its charge mode, i.e. FIG. 5a, and discharge mode, i.e. FIG. 5b.

The rechargeable battery 42 has a different single repeating unit compared to the one in FIGS. 3 and 4. The single repeating unit 43 has the means for storing carbon integrated into the interconnect 44. Thus the interconnect has the function of electrically connecting the single repeating units 43 of the battery 42 as well as the one of converting and storing the carbon produced during the recharging process. As shown in FIG. 5a, during recharging the $CO_2$ fed to the battery 42 enters at the inlet 45 of channel 46 and flows towards inlet 47 of the negative electrode 48 of each single repeating unit 43. Means for directing the flow 49 from channel 51 towards the negative electrode 48 may be present. The $CO_2$ entering the unit 43 is converted into CO and in turn into carbon particles which are stored in the interconnect 44. The single repeating units 43 are also characterized by the presence of means for directing the flow 50 from the negative electrode to the interconnect comprising the means for storing the carbon produced.

When operated in discharge mode, the flows are inverted, thus means 50 directs the flow of the product of the gasification of the carbon comprised in the interconnects, e.g. $CO/CO_2$ blend in a ratio 33/67, towards the negative electrode 48. The oxygen gas flows in a direction normal to the gas blend flow and oxygen ions transported through the electrolyte react with the CO to produce $CO_2$. $CO_2$ leaves the rechargeable battery though channel 51 and in turn through the outlet 45. The means 49 for directing flow during operation in the discharging mode directs $CO_2$ towards channel 51 while recycling gas blends rich in CO through the interconnect 44 and in turn though the negative electrode 48.

The interconnect 44 may be composed of steel with the outer surfaces coated with a material that does not catalyze the Boudouard reaction, and the inner surfaces may be characterized by high porosity and coated with NiFe alloy. The negative electrode 48 may be composed of a porous ion-conducting scaffold of Sc- and Y-stabilized zirconia in which the surfaces are coated first with an electron conducting material such as Ca-doped $YCrO_3$ or Mo- and Ni-doped $SrTiO_3$ and then coated with nanoparticle catalysts of ceria doped with rare earth elements such as Gd, Sm, Pr, La, Y, and Yb.

Figure 6B:
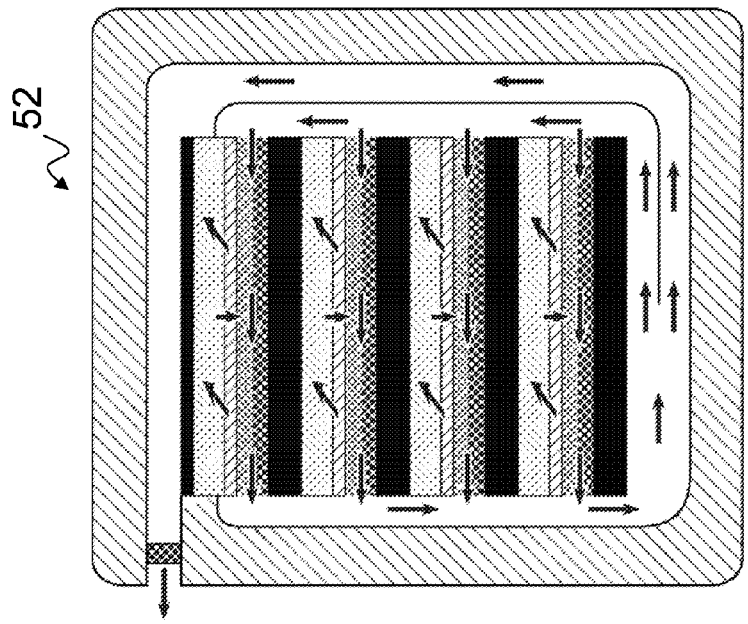
FIG. 6b.
Figure 6A:
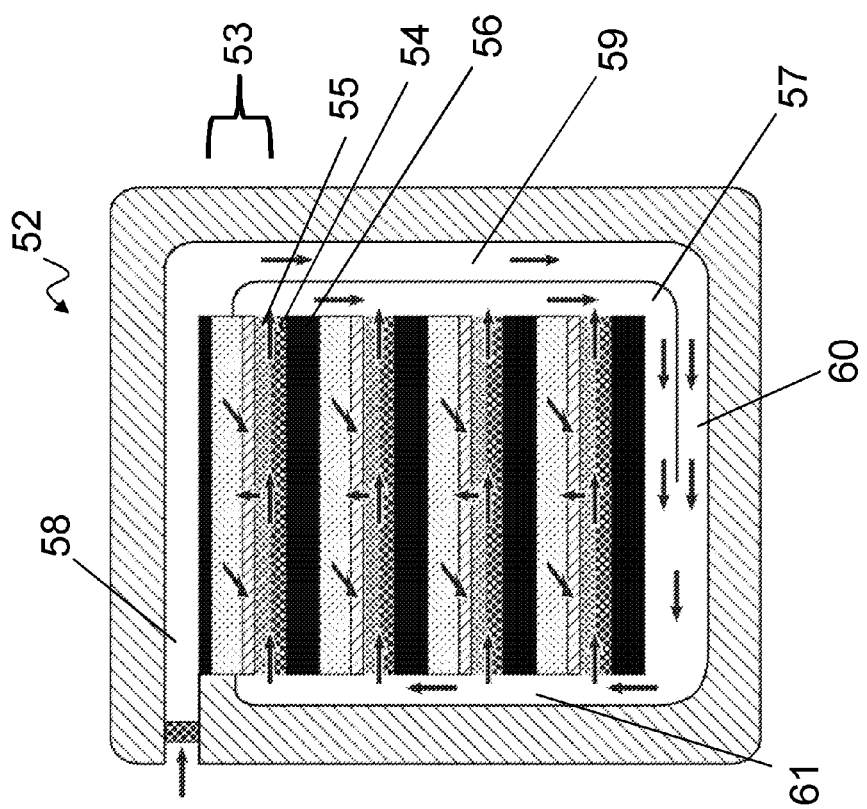
FIG. 6a, and discharge mode, i.e.

FIG. 6 is a schematic drawing of the electrochemical device according to one embodiment of the invention where the means for converting and storing the converted product is an interlayer between the negative electrode and the interconnect layer. The electrochemical device is shown as operating in its charge mode, i.e. FIG. 6a, and discharge mode, i.e. FIG. 6b.

The rechargeable battery 52 has a different single repeating unit compared to the previous of FIGS. 3, 4 and 5. The single repeating unit 53 is characterized by the presence of the means for converting and storing carbon as an interlayer 54 between the negative electrode 55 and the interconnect 56. The battery 52 is also characterized by means 57 to direct flow around the stack of electrochemical cells having single repeating units 53. Battery 52 is characterized by a gas composition which is approximately the same everywhere across the device due to the close proximity of the Boudouard reaction sites to the electrochemical reaction sites. For example during charging operational mode, FIG. 6a, $CO_2$ enters the battery 52 at inlet 58. Through channels 59, 60 and 61, $CO_2$ flows towards the stack of electrochemical cells and enters the single repeating units 53. At the negative electrode 55 the $CO_2$ is converted into CO and in turn into C that is deposited in the interlayer 54. Gas blends $CO/CO_2$, such as 5/95, recirculate within the battery through means 57, i.e. channel 57, directing the flow around the stack of electrochemical cells having single repeating units 53.

During discharge of battery 52, flows are reversed, and gas composition remains approximately constant inside the cell.

The interlayer 54 may be a layer such as a highly porous metal foam, e.g. copper foam coated with NiFe alloy, adapted to store the carbon particles that will be formed by operating the battery 52 in the charge mode. The negative electrode 55 may be composed of a mixture of copper and rare-earth doped ceria nanoparticles.

Figure 7A:
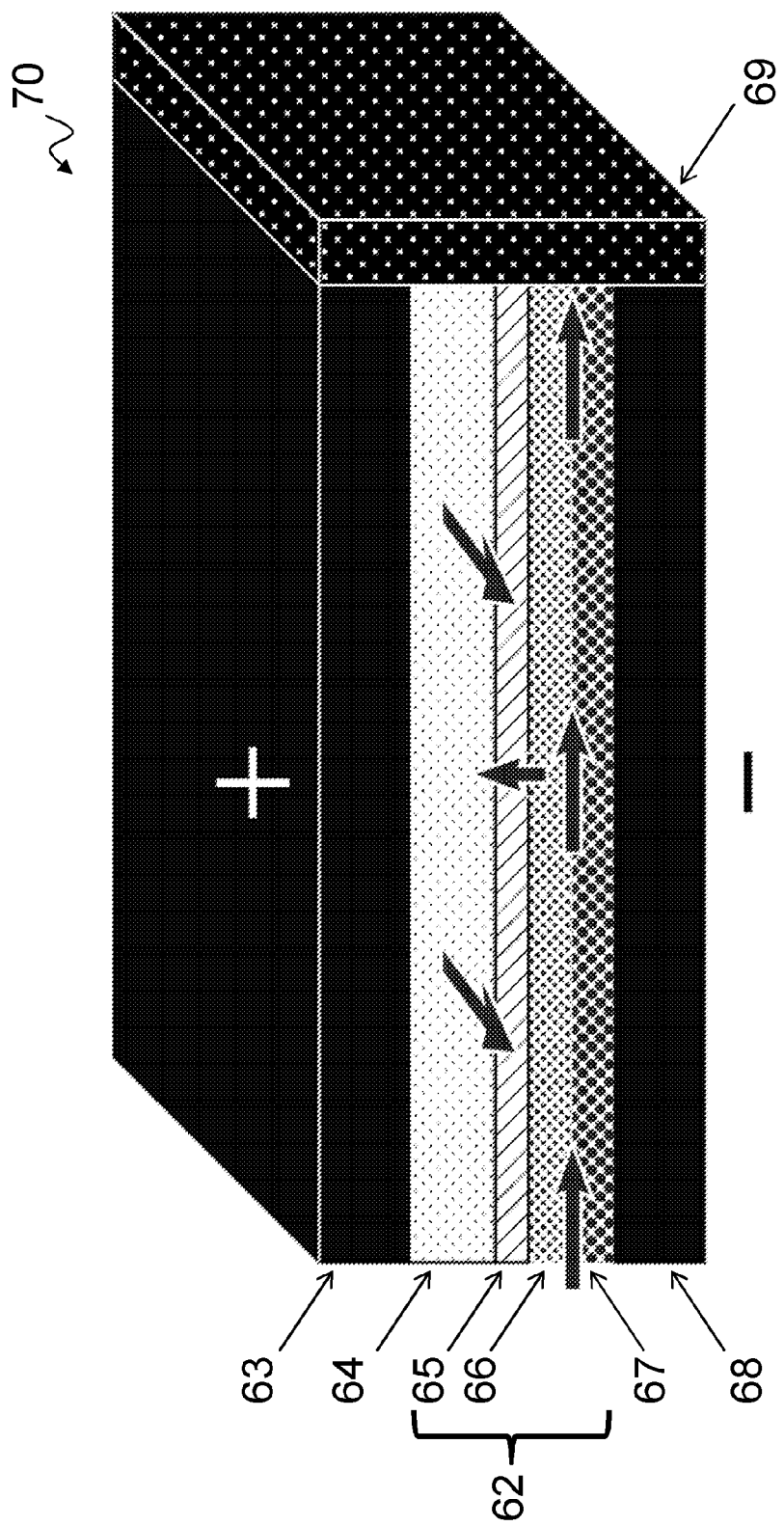
FIG. 7a is a schematic drawing of a single repeating unit of the electrochemical device according to one embodiment of the invention characterized by single repeating units that are closed on one end so that the gas entering is fully converted within each single unit.

FIG. 7a is a schematic drawing of a single repeating unit of the electrochemical device according to one embodiment of the invention characterized by a single repeating unit that do not share gas flow, i.e. the single repeating units are closed at one end so that the gas entering is fully converted within each single unit. The rechargeable battery 52 of the invention may comprise a stack of electrochemical cells manufactured by stacking single repeating units as shown in FIG. 7a.

The single repeating unit 62 consists of a porous positive electrode 64 and a porous negative electrode 66 that are separated by a dense layer of electrolyte 65. The negative electrode 66 is in contact with the layer 67, between the negative electrode 66 and an interconnect layer 68, which has the function of storing the carbon produced by the conversion of $CO_2$. The unit 62 is completed by two dense layers of interconnects 63 and 68. FIG. 7a shows the gas flow direction during the charge mode, i.e. $CO_2$ flows through the porous negative electrode and is converted into CO and oxide ions. The oxide ions are transported across the electrolyte 24 and form $O_2$ gas that flows out of the porous positive electrode.

The unit 62 is characterized by the presence of a barrier layer 70 that seals the negative electrode chamber of the unit. The unit 62 is thus characterized by a passive flow, i.e. during charge mode the $CO_2$ entering the unit is completely converted to carbon.

As the single unit 70 is based on a passive flow principle, the battery 52, when employing single unit 70, will not need means 57 to further direct the flow around the stack of electrochemical cells.

Figure 7C:
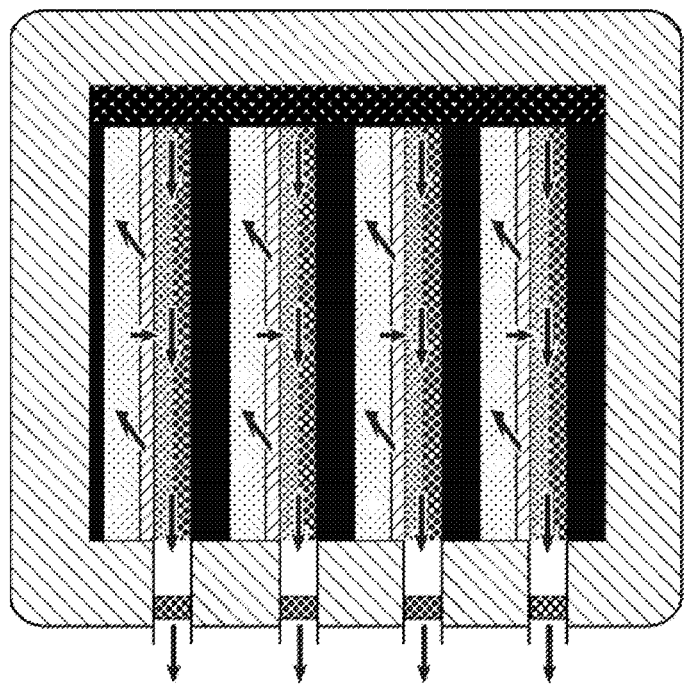
Figure 7B:
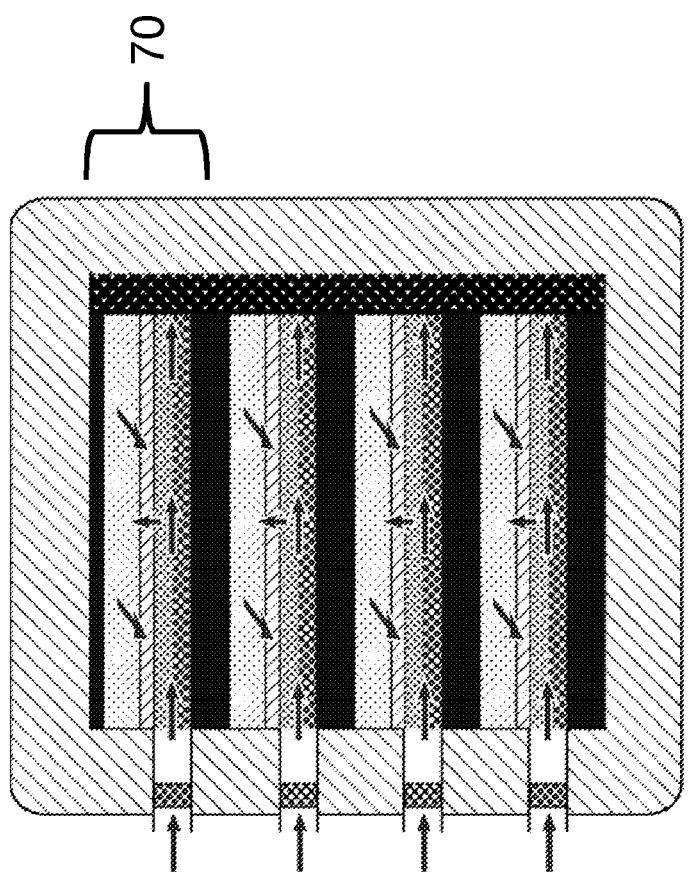

FIGS. 7b and 7c are schematic drawings of the electrochemical device according to one embodiment of the invention characterized by a single repeating unit 70 as shown in FIG. 7a, i.e. the single repeating units are sealed at one end so that the gas entering is fully converted within each single unit and where the means for converting and storing the product is a layer intercalated between the fuel electrode and the interconnect layer. The electrochemical device is shown as operating in its charge mode, i.e. FIG. 7b, and discharge mode, i.e. FIG. 7c.

Figure 8B:
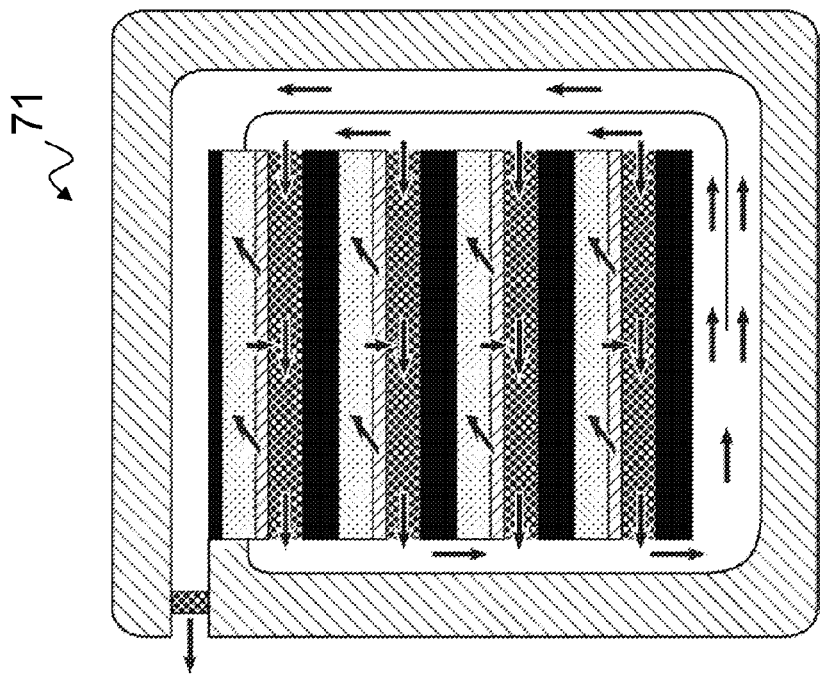
FIG. 8b.
Figure 8A:
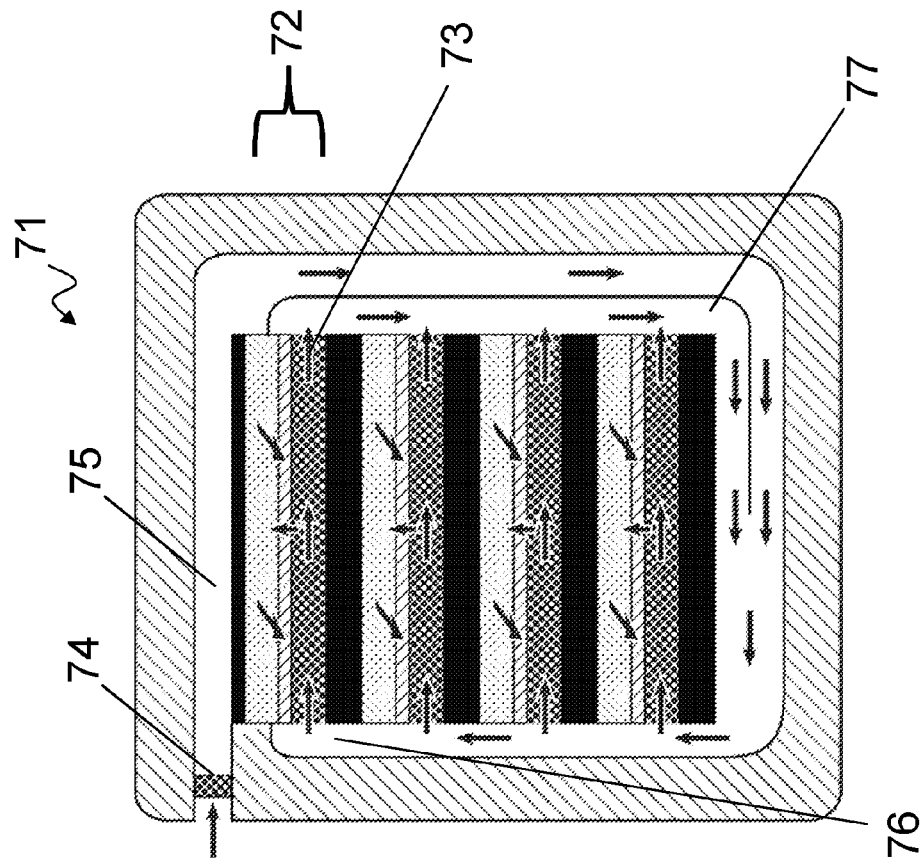
FIG. 8a, and discharge mode, i.e.

FIG. 8 is a schematic drawing of the electrochemical device according to one embodiment of the invention where the means for storing and converting the product is comprised in the negative electrode. The electrochemical device is shown as operating in its charge mode, i.e. FIG. 8a, and discharge mode, i.e. FIG. 8b.

The rechargeable battery 71 has a different single repeating unit compared to the previous embodiments. The single repeating unit 72 is characterized by the presence of the means for storing carbon integrated into the negative electrode 73.

Thus, when operating in charge mode, both conversions from $CO_2$ to CO and to solid carbon occur in the same layer, i.e. the negative electrode 73. During charging, the formation of CO is followed by the immediate conversion into carbon, in fact CO may be present only as a reaction intermediate or it may not be present at all. The negative electrode 73, in the charge mode has the function of converting $CO_2$ into CO as well as converting CO into C and storing the carbon produced during the charging process. As shown in FIG. 8a, during charging the $CO_2$ fed to the battery 71 enters at the inlet 74 of channel 75 and flows towards inlet 76 of the negative electrode 73 of each single repeating unit 72. The $CO_2$ entering the unit 72 is converted into CO and in turn into C particles which are stored in the negative electrode 73. The battery 71 is also characterized by means 77 to direct flow around the stack of electrochemical cells having single repeating units 72.

Battery 71 is characterized by a gas composition which is the same everywhere across the cell due to the close proximity of the Boudouard reaction sites to the electrochemical reaction sites. For example during charging operational mode, FIG. 8a, $CO_2$ enters the battery 71 at inlet 74. Through channel 75, $CO_2$ flows towards the stack of electrochemical cells and enters each single repeating unit 72. At the negative electrode 73 the $CO_2$ is converted into CO and in turn into carbon and deposited in the negative electrode 73. Gas blends $CO/CO_2$, such as 5/95, recirculate within the battery through means 77, i.e. channel 77 directs the flow around the stack of electrochemical cells having single repeating units 72. During discharge of battery 71, FIG. 8b, flows are reversed, and gas composition remains constant inside the cell both in discharge or charge mode.

The negative electrode 73 may be composed of a rare earth doped ceria scaffold with surfaces that are coated first with nickel and molybdenum doped strontium ferrite perovskite and then coated with iron and cobalt.

Figure 9A:
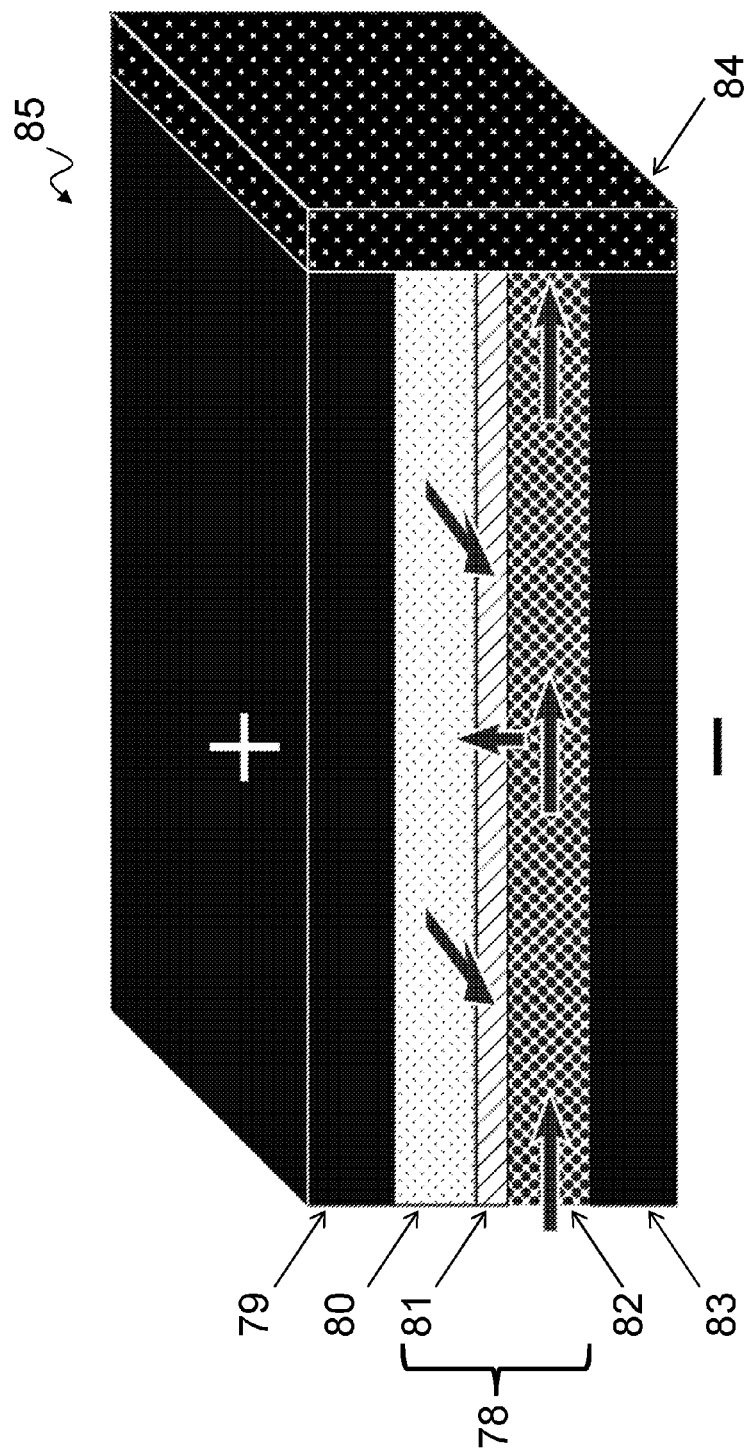
FIG. 9a is a schematic drawing of a single repeating unit of the electrochemical device according to one embodiment of the invention characterized by single repeating units that are closed on one end so that the gas entering is fully converted within each single unit.

FIG. 9a is a schematic drawing of a single repeating unit of the electrochemical device according to one embodiment of the invention characterized by a single repeating unit that does not share gas flow, i.e. the single repeating units are sealed at one end so that the gas entering is fully converted within each single unit.

The rechargeable battery 71 of the invention may comprise a stack of electrochemical cell manufactured by stacking single repeating units 78 as shown in FIG. 9a.

The single repeating unit 78 consists of a porous positive electrode 80 and a porous negative electrode 82 that are separated by a dense layer of electrolyte 81. The negative electrode 82 has also the function of storing the carbon produced by the conversion of $CO_2$. The unit 78 is completed by two dense layers of interconnects 79 and 83. FIG. 9a shows the gas flow direction during the charge mode, i.e. $CO_2$ flows through the porous negative electrode and is converted into CO and oxide ions. The oxide ions are transported across the electrolyte 24 and form $O_2$ gas that flows out of the porous positive electrode. The unit 78 is characterized by the presence of a barrier layer 84 that seals the negative electrode chamber of the unit. The unit 78 is thus characterized by a passive flow, i.e. during charge mode the $CO_2$ entering the unit is completely converted into carbon.

As the single unit 78 is based on a passive flow principle, the battery 71, when employing single unit 78, will not need means 77 to further direct the flow around the stack of electrochemical cells.

Figure 9C:
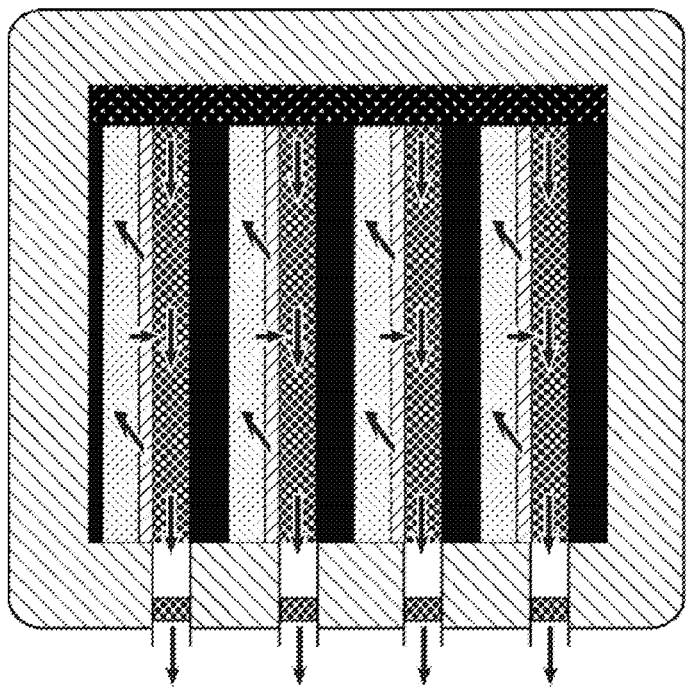
Figure 9B:
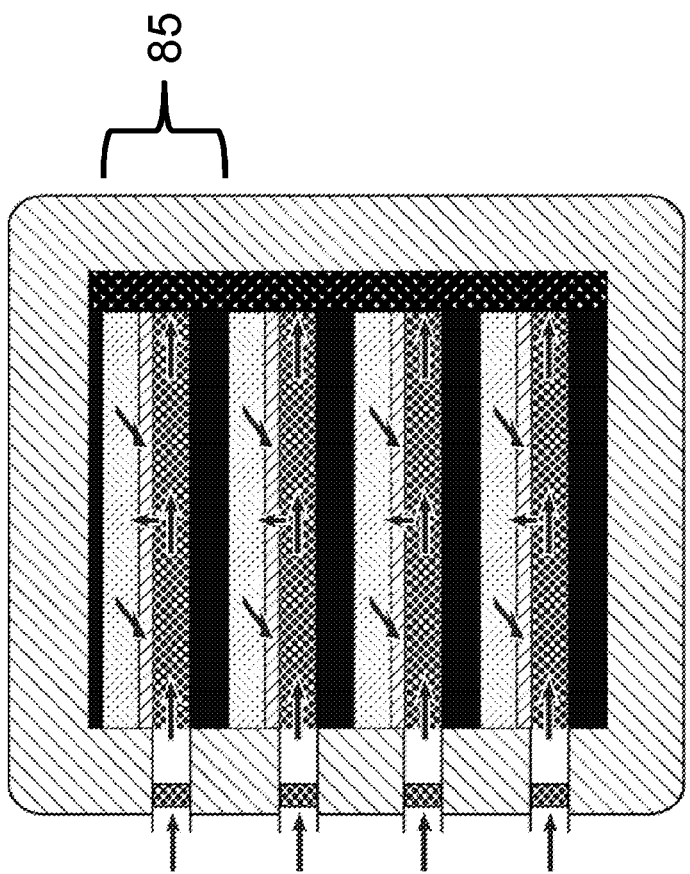

FIGS. 9b and 9c are schematic drawings of the electrochemical device according to one embodiment of the invention characterized by a single repeating unit 85 as shown in FIG. 9a, the single repeating units are sealed at one end so that the gas entering is fully converted within each single unit and where the means for converting and storing the converted product is comprised in the fuel electrode. The electrochemical device is shown as operating in its charge mode, i.e. FIG. 9b, and discharge mode, i.e. FIG. 9c.

Figure 10:
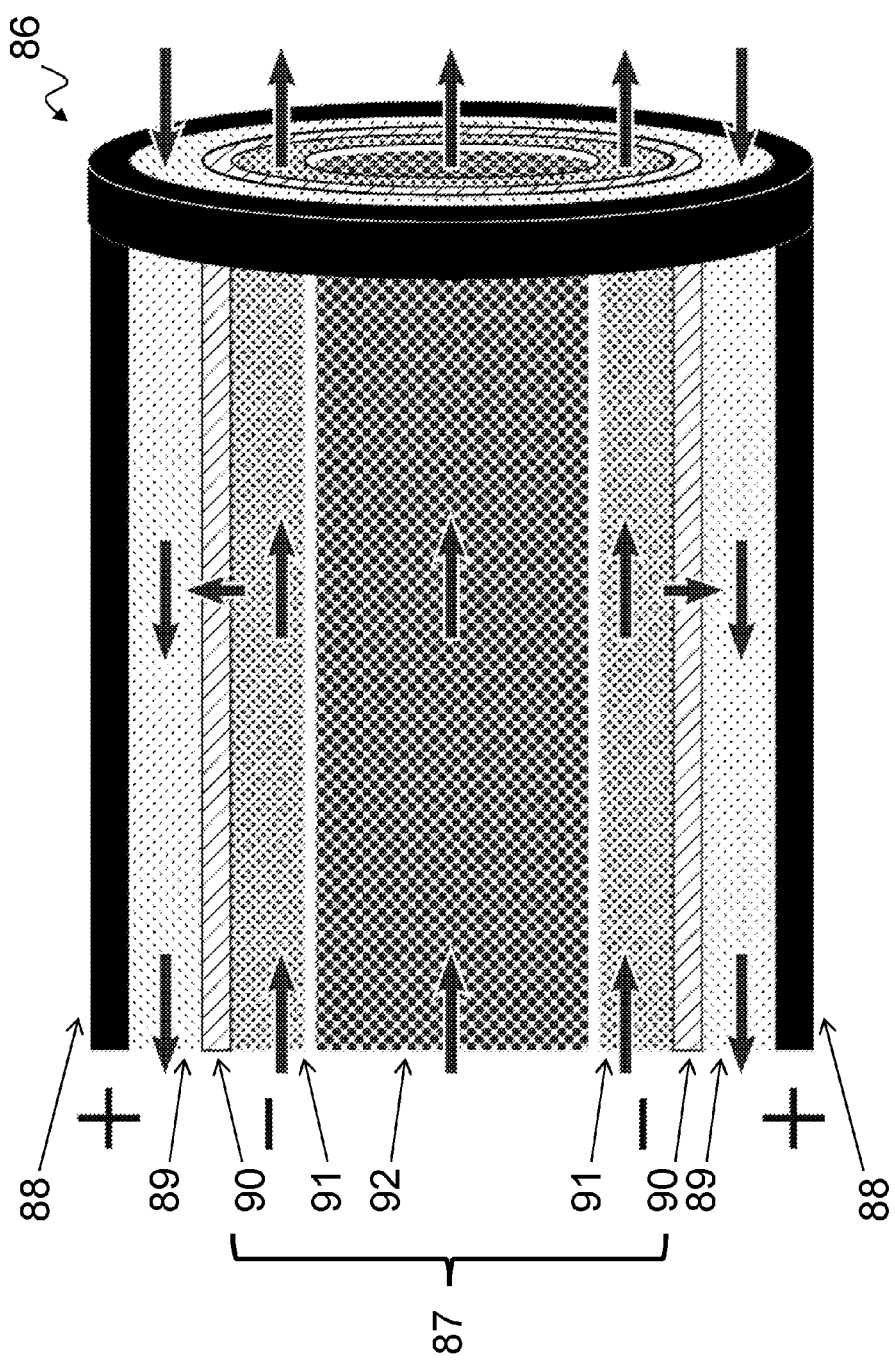
FIG. 10 is a schematic drawing of a single repeating unit of the electrochemical device according to one embodiment of the invention characterized by single repeating units that have a tubular geometry with the carbon holder present as a porous cylinder at the core of the tube.

FIG. 10 is a schematic drawing of a single repeating unit 86 of the electrochemical device according to one embodiment of the invention characterized by single repeating units that have a tubular geometry, with the carbon holder 92 present as a porous cylinder at the core of the tube. The single repeating unit 86 consists of a porous positive electrode 89 and a porous negative electrode 91 that are separated by a dense layer of electrolyte 90. In the prior examples, the electrochemical cells were depicted with a planar geometry, however any suitable geometry may be used to manufacture the electrochemical device. In this embodiment, the carbon holder 92 is with the negative electrode 91 together in the same gas chamber 87, like the interlayer 54 in FIG. 6, and additionally the carbon holder 92 may also be a removable cartridge like the carbon holder 32 in FIG. 4. The gas flows are shown for charge mode in FIG. 10. The $CO/CO_2$ reactant gas mixture is supplied in the central chamber 87 of the tube, where it is enriched in CO by $CO_2$ electrolysis occurring at the negative electrode 91 and carbon is deposited by the Boudouard reaction in the carbon holder 92. Like in FIGS. 6, 7, 8, and 9, the two reactions occur simultaneously along the flow channel, resulting in a gas composition which is approximately the same everywhere across the device due to the close proximity of the Boudouard reaction sites to the electrochemical reaction sites. Oxygen is produced at the porous positive electrode 89. The dense interconnect 88 provides a high conductivity path for the current. In the tubular cell, the interconnects may alternatively be porous instead of dense because the electrolyte 90 can solely provide the separation of gas compartments and in that case an additional interconnect layer may be also present in between the negative electrode 91 and the carbon holder 92. FIG. 10 shows a tubular cell that is open on both ends where sealing takes place at each end of the electrolyte 90 and current is collected at each end from the electrodes and interconnects. Similar to FIGS. 7 and 9, the unit 86 could also be closed on one end to obtain a passive flow type battery. The carbon holder 92 may comprise a porous metal foam that catalyses the Boudouard reaction, or it may comprise a porous metal or ceramic matrix composed of material that does not catalyse the Boudouard reaction which is coated with a material that does catalyse the Boudouard reaction. A collection of single repeating units 86 are arranged in a stack to comprise the rechargeable battery.

Figure 11:
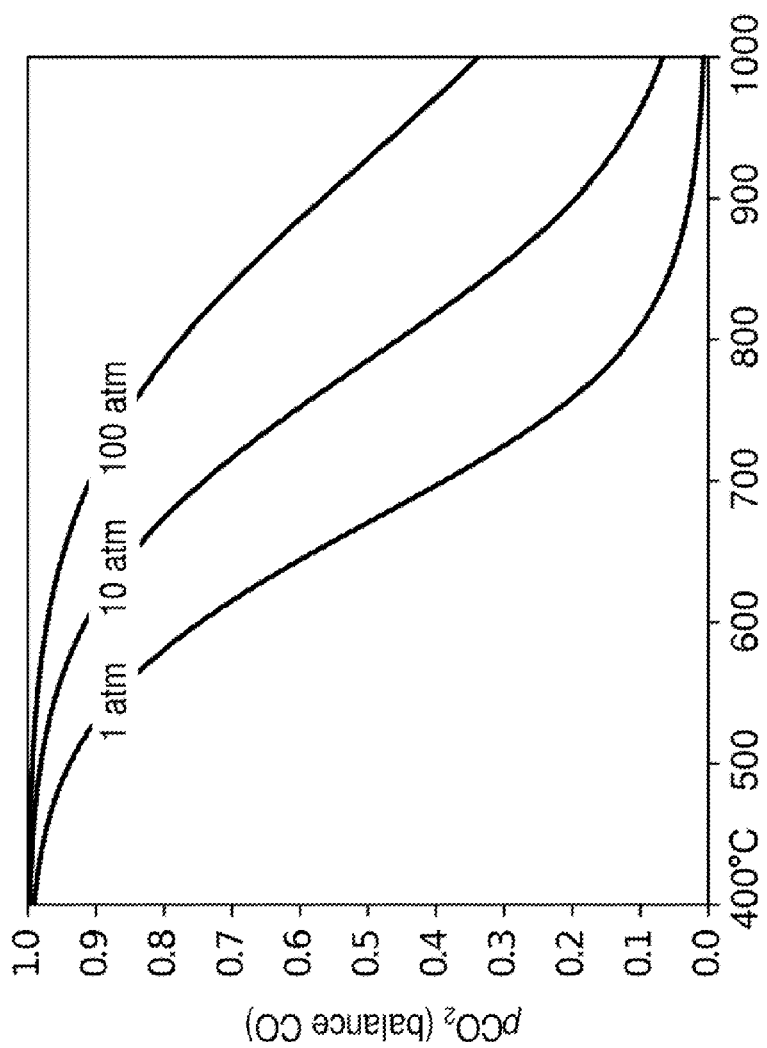
FIG. 11 is a graphical representation of the thermodynamic equilibrium of the Boudouard reaction at different pressures, i.e. 1, 10 and 100 atmospheres where the behavior of the partial pressure of $CO_2$ vs. the temperature is shown.

FIG. 11 is a graphical representation of the thermodynamic equilibrium of the Boudouard reaction at different pressures (1, 10 and 100 atmospheres) where the behavior of the partial pressure of $CO_2$ vs. the temperature is shown. When supplying a $CO/CO_2$ gas mixture with a $CO_2$ mole fraction lower than shown on the curves, the Boudouard reaction will deposit carbon and convert CO to $CO_2$ until the equilibrium $CO/CO_2$ mixture is reached. When supplying a $CO/CO_2$ gas mixture with a $CO_2$ mole fraction higher than shown on the curves, the Boudouard reaction will gasify carbon with $CO_2$ to obtain CO until the equilibrium $CO/CO_2$ mixture is reached. Based on the design of the rechargeable battery, a suitable operating regime can be chosen using this thermodynamic data.

FIG. 12 is a schematic drawing of the electrochemical device according to one embodiment of the invention where several batteries are operated at different temperatures and arranged so that heat is transferred between adjacent batteries. In the prior figures, the heat transfer occurs within a battery, such that the battery is operating nearly isothermal or with a small temperature gradient between electrochemical cells and carbon holder. The arrangement in FIG. 12 provides an alternative path for heat flow. The device 101 comprises four batteries 102-105, each containing a stack of electrochemical cells and a carbon holder as in the prior figures. FIG. 12*a* shows the gas and heat flows during charge mode. $CO_2$ or a $CO_2$-rich mixture of $CO/CO_2$ 106 is supplied to each of the batteries, carbon is deposited within each battery, and $O_2$ 107 is produced by each battery. Battery 102 is operated at 750° C., battery 103 is operated at 700° C., battery 104 is operated at 650° C., and battery 105 is operated at 600° C. In battery 102, the heat generated by the exothermic carbon deposition reaction is transferred 108 to the endothermic $CO_2$ electrolysis reaction in battery 103, which is operating at lower temperature. The heat generated in battery 103 is transferred to battery 104 and so on. The batteries 102-105 are encased by insulation 109. FIG. 12*b* shows the gas and heat flows during discharge mode. Whereas the gas flows are reversed, heat flows in the same direction as in charge mode. In FIG. 12*b* the heat flows from the exothermic CO electro-oxidation reaction in battery 102 to the endothermic carbon gasification reaction in battery 103. In general, both in charge and discharge modes, any excess heat from one battery can be utilized in an adjacent battery that operates at lower temperature. The batteries 102-105 may also be arranged so that the gas flow is serial, e.g. the outlet $CO/CO_2$ gas mixture from battery 102 is supplied to the inlet of battery 103 and so on, which can be used to provide a final outlet gas that is very rich in $CO_2$. In another embodiment the temperature gradient is present within a single battery, e.g. the first cell is operating at higher temperature than the second cell in the stack and so on.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A rechargeable battery for storing electrical energy, said rechargeable battery comprising:
   a stack of electrochemical cells configured to produce carbon monoxide gas when supplied with electricity and carbon dioxide gas;
   a means for converting the carbon monoxide gas produced by the electrochemical cells into elemental carbon in its solid form; and
   a means for storing the elemental carbon in its solid form;
   wherein said rechargeable battery is configured to be charged by supplying electricity and carbon dioxide gas to said rechargeable battery; and
   wherein said rechargeable battery is configured to be discharged by converting elemental carbon in its solid form to carbon dioxide gas, thereby generating electricity.

2. The rechargeable battery according to claim 1, wherein said means for converting is integrated in said rechargeable battery.

3. The rechargeable battery device according to claim 1, wherein said means for storing is integrated in said rechargeable battery.

4. The rechargeable battery according to claim 1, wherein said means for converting comprises said means for storing.

5. The rechargeable battery according to claim 1, wherein said means for storing is a carbon holder.

6. The rechargeable battery according to claim 1, wherein said means for storing comprises an interlayer between at least two electrochemical cells of said stack of electrochemical cells.

7. The rechargeable battery according to claim 1, wherein said means for storing comprises an electrode or an interconnect of the stack of electrochemical cells.

8. The rechargeable battery according to claim 1, wherein said means for converting is in thermal contact with said stack of electrochemical cells, such that heat transfer can occur between electrodes of the electrochemical cells and the means for converting.

9. The rechargeable battery according to claim 1, wherein each electrochemical cell in said stack of electrochemical cells comprises a solid state electrolyte layer.

10. A method of operating a rechargeable battery for storing electrical energy,
comprising:
providing a rechargeable battery comprising:
a stack of electrochemical cells configured to produce carbon monoxide gas when supplied with electricity and carbon dioxide gas;
a means for converting the carbon monoxide gas into elemental carbon in its solid form; and
a means for storing the elemental carbon in its solid form;
charging said rechargeable battery by feeding electricity and carbon dioxide gas to said rechargeable battery, thereby producing elemental carbon in its solid form that is stored in the means for storing; and
discharging said rechargeable battery by transforming at elemental carbon in its solid form that is stored in the means for holding or externally supplied into carbon dioxide gas.

11. The method of operating said rechargeable battery according to claim 10, wherein said discharging comprises:
feeding gas to said means for converting and storing; and
operating said stack of electrochemical cells in a second mode, thereby producing electricity.

12. The method according to claim 11, wherein the gas comprises air or oxygen.

13. A rechargeable battery comprising:
a stack of electrochemical cells, each cell comprising a porous positive electrode separated from a porous negative electrode by a layer of electrolyte, and a holder comprising a reaction chamber with surfaces configured to catalyze the Boudouard reaction;
a first port in fluid connection with the porous negative electrode of each cell of the stack of electrochemical cells;
a second port in fluid connection with the porous positive electrode of each cell of the stack of electrochemical cells;
wherein the rechargeable battery is configured to be charged by supplying electricity to the positive and negative electrodes of the stack of electromechanical cells and supplying carbon dioxide gas to the first port, whereby the carbon dioxide gas is converted to carbon monoxide gas in the stack of electrochemical cells, whereby the carbon monoxide gas is converted to solid elemental carbon in the holder.

14. The rechargeable battery according to claim 13, wherein the rechargeable battery is configured to be discharged by supplying air or oxygen gas to the second port, whereby the solid carbon in the holder is gasified into a blend of carbon monoxide gas and carbon dioxide, and whereby the carbon monoxide gas is converted into carbon dioxide in the stack of electrochemical cells thereby producing electricity.

15. The rechargeable battery according to claim 14, wherein the holder is in thermal communication with the stack of electrochemical cells, such that:
during charging of the rechargeable battery heat produced in the holder during the conversion of carbon monoxide gas to solid elemental carbon is supplied to the stack of electrochemical cells;
during discharge of the rechargeable battery, heat produced in the stack of electrochemical cells during the conversion of carbon monoxide gas to carbon dioxide is supplied to the holder.

16. The rechargeable battery according to claim 15, wherein the holder comprises a removable cartridge.

17. The rechargeable battery according to claim 15, wherein the holder comprises a plurality of layers positioned between the cells of the stack of electrochemical cells.

* * * * *